US008908042B2

(12) United States Patent
Ohkawa et al.

(10) Patent No.: US 8,908,042 B2
(45) Date of Patent: Dec. 9, 2014

(54) MONITORING CAMERA SYSTEM, VIDEO RECORDING APPARATUS AND VIDEO RECORDING METHOD

(75) Inventors: Kentarou Ohkawa, Fukuoka (JP); Kenichiro Sugimoto, Fukuoka (JP); Takahiro Yamaguchi, Fukuoka (JP); Takayuki Haraguchi, Fukuoka (JP); Kazuhisa Tsuzuki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 281 days.

(21) Appl. No.: 13/148,454

(22) PCT Filed: Feb. 8, 2010

(86) PCT No.: PCT/JP2010/000757
§ 371 (c)(1),
(2), (4) Date: Aug. 8, 2011

(87) PCT Pub. No.: WO2010/092789
PCT Pub. Date: Aug. 19, 2010

(65) Prior Publication Data
US 2012/0002054 A1 Jan. 5, 2012

(30) Foreign Application Priority Data
Feb. 10, 2009 (JP) ................. 2009-028923

(51) Int. Cl.
| | |
|---|---|
| H04N 7/18 | (2006.01) |
| H04N 5/76 | (2006.01) |
| G06T 1/00 | (2006.01) |
| G08B 13/196 | (2006.01) |
| G11B 27/28 | (2006.01) |
| H04N 9/82 | (2006.01) |

(52) U.S. Cl.
CPC .. *H04N 5/76* (2013.01); *G06T 1/00* (2013.01); *G08B 13/1961* (2013.01); *G08B 13/19613* (2013.01); *G08B 13/19676* (2013.01); *G11B 27/28* (2013.01); *H04N 7/188* (2013.01); *H04N 9/8205* (2013.01)
USPC ........................................................ 348/153

(58) Field of Classification Search
USPC ........................................................ 348/153
See application file for complete search history.

(56) References Cited

U.S. PATENT DOCUMENTS 6,456,322 B1 * 9/2002 Marinacci ..................... 348/156
2002/0006163 A1 * 1/2002 Hibi et al. ................. 375/240.16
(Continued)

FOREIGN PATENT DOCUMENTS

| JP | 01/245395 | 9/1989 |
| JP | 20061238102 | 9/2006 |

(Continued)

OTHER PUBLICATIONS

International Search Report dated Mar. 9, 2010.

*Primary Examiner* — Sath V Perungavoor
*Assistant Examiner* — Peter D Le
(74) *Attorney, Agent, or Firm* — Dickinson Wright PLLC

(57) ABSTRACT

A video recording method includes: detecting an intrusion of a person into a predetermined monitoring area based on the video information from the monitoring camera; recording the intrusion time when the intrusion of the person into the monitoring area is detected; detecting a left-behind object after the person has passed through the monitoring area based on the video information from the monitoring camera; generating alarm information in response to the detection of the left-behind object; overwriting so as to record the video information by every given amount of information until the alarm information is received. The method further includes receiving and recording, of the video information recorded in the first video recording step, video information from the intrusion time of the person to a time corresponding to the alarm information in accordance with the intrusion time of the person in a case in which the alarm information is generated.

8 Claims, 3 Drawing Sheets

(56) References Cited

U.S. PATENT DOCUMENTS

| | | | |
|---|---|---|---|
| 2004/0161133 A1* | 8/2004 | Elazar et al. | 382/115 |
| 2004/0223629 A1* | 11/2004 | Chang | 382/118 |
| 2005/0035858 A1* | 2/2005 | Liu | 340/541 |
| 2005/0146605 A1* | 7/2005 | Lipton et al. | 348/143 |
| 2006/0193534 A1 | 8/2006 | Hirose | |
| 2006/0210175 A1 | 9/2006 | Huang | |
| 2007/0070187 A1* | 3/2007 | Lin et al. | 348/14.04 |
| 2007/0127774 A1* | 6/2007 | Zhang et al. | 382/103 |
| 2007/0217761 A1* | 9/2007 | Chen et al. | 386/86 |
| 2009/0015718 A1* | 1/2009 | Hirai et al. | 348/584 |
| 2010/0026802 A1* | 2/2010 | Titus et al. | 348/143 |

FOREIGN PATENT DOCUMENTS

| | | |
|---|---|---|
| JP | 2007/251321 | 9/2007 |
| JP | 2007-300531 | 11/2007 |
| JP | 2008/011056 | 1/2008 |

\* cited by examiner

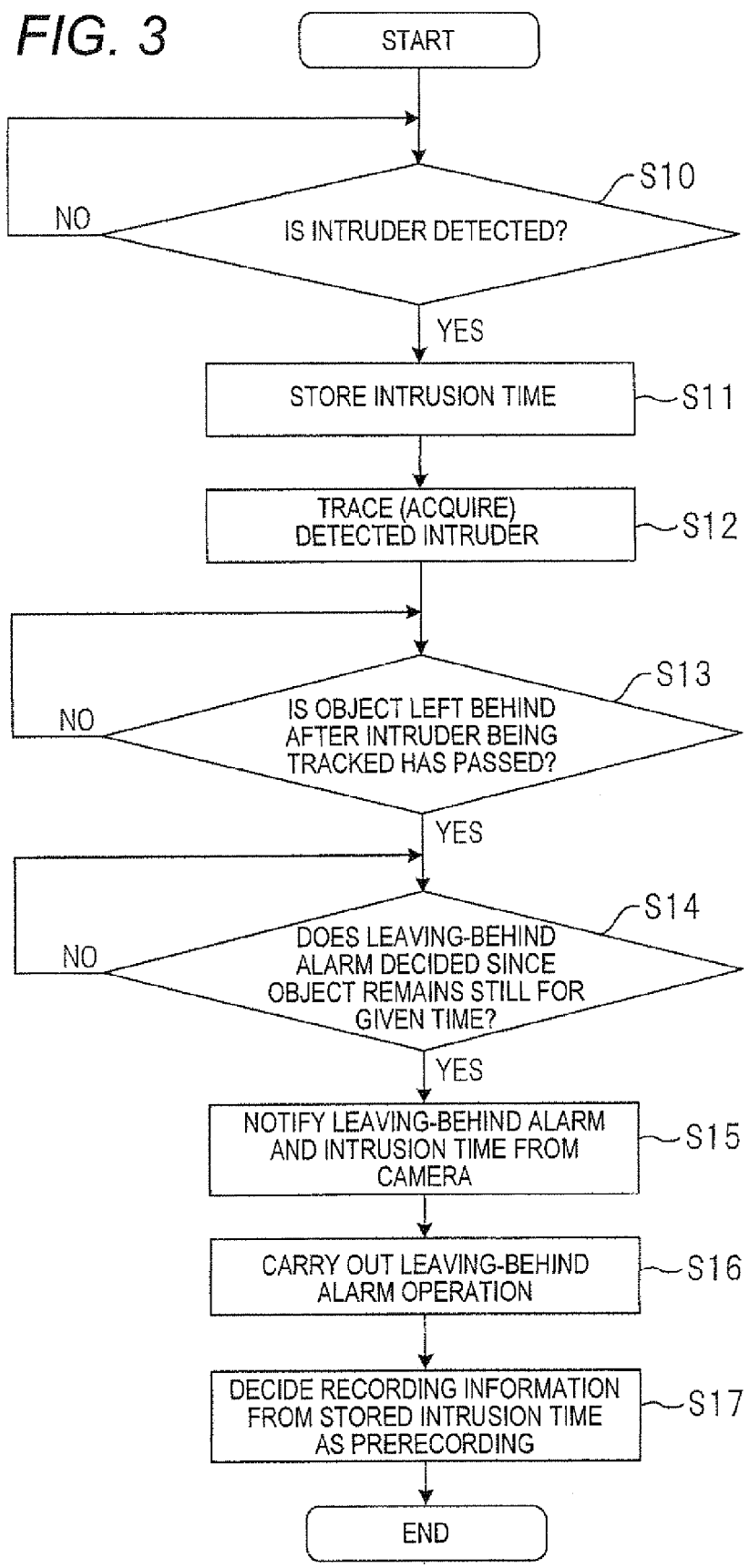

MONITORING CAMERA SYSTEM, VIDEO RECORDING APPARATUS AND VIDEO RECORDING METHOD

TECHNICAL FIELD

The present invention relates to a monitoring camera system, a video recording apparatus, and a video recording method.

BACKGROUND ART

In a monitoring camera system which includes a monitoring camera and a video recording apparatus configured to record video information from the monitoring camera, recording operation includes: alarm recording which starts to record video information when an intruder is detected; and prerecording which always records video information in a recording medium such as a memory and which stores video information recorded in the recording medium as a pre-alarm record when an alarm is generated.

In the case of prerecording, for a prerecording time, a given time set in advance is generally used, but the prerecording time may be changed depending on the type of alarm. For example, Patent Document 1 discloses a stored motion image selection device. The stored motion image selection device selectively stores, for a long term, motion image data of a partial range of the motion image including a portion prior to a trigger when the trigger is detected. The trigger is a trigger for storing, for a long term, a part of the motion image data which is obtained by capturing a predetermined scene and which is temporarily stored. The stored motion image selection device includes: a separation setting storage unit which stores a separation condition as a candidate of the range of motion image data for long term storage for each type of trigger in advance; a trigger type discrimination unit which discriminates the type of the detected trigger; and a separation selection unit which selects the separation including the trigger based on the discriminated type of the trigger with reference to the separation setting storage unit and which sends motion image data for the selected separation to a long-term storage memory. In the stored motion image selection device, the type of a trigger is substantially the same as the type of alarm.

RELATED ART DOCUMENTS

Patent Documents

Patent Document 1: JP-A-2008-011056

SUMMARY OF THE INVENTION

Problem to be Solved by the Invention

However, in the stored motion image selection device described in Patent Document 1, the recording time varies depending on the type of trigger, but the recording time for the same type of trigger is constant. For this reason, even when anyone enters a certain region and leaves behind an object (for example, a bag) in the region, although the stored motion image selection device can detect leaving-behind and record a video before and after the object is left behind, there is a problem in that a video when a person enters the region is not recorded.

The invention has been made in consideration of the above-described situation, and an object of the invention is to provide a monitoring camera system, a video recording apparatus, and a video recording method capable of recording efficiently, i.e., without wastefully spending a recording medium, the behavior of a person, at the time of intrusion into a region, who has left behind an object in a case in which the person has left behind the object such as when the leaving-behind is detected.

Means for Solving the Problem

A monitoring camera system of the invention includes: a monitoring camera; and a video recording apparatus configured to record video information received from the monitoring camera, wherein the monitoring camera includes: imaging means; person detection means for detecting an intrusion of a person into a predetermined monitoring area based on video information obtained by the imaging means; time recording means for, when the intrusion of the person into the monitoring area is detected by the person detection means, recording an intrusion time; object detection means for detecting a left-behind object after the person has passed through the monitoring area based on the video information obtained by the imaging means; alarm information generation means for generating alarm information when a given time elapses after the left-behind object in the monitoring area is detected by the object detection means; and transmission means for transmitting the video information obtained by the imaging means, the alarm information generated by the alarm information generation means, and the intrusion time of the person recorded by the time recording means, and wherein the video recording apparatus includes: reception means for receiving the video information, the alarm information, and the intrusion time of the person transmitted from the transmission means of the monitoring camera; first video recording means for recording the video information received by the reception means; and second video recording means for receiving via a transfer from the first video recording means and recording, of the video information recorded in the first video recording means, video information from the intrusion time of the person to a time corresponding to the alarm information in accordance with the alarm information and the intrusion time of the person received by the reception means.

With this configuration, the monitoring camera is configured to: record the intrusion time when an intruder is detected; track the detected intruder; decide an alarm if an object is left behind after the intruder has passed through the monitoring area and if the object continues to remain still for a given time; and transmit the alarm information and the intrusion time to the video recording apparatus. In addition, the video recording apparatus is configured to: receive the video information transmitted from the monitoring camera and record the video information in the first video recording means; and when alarm information and the intrusion time of the person transmitted from the monitoring camera are received, transfer, of the video information recorded in the first video recording means, the video information from the intrusion time of the person to the time corresponding to the alarm information from the first video recording means to the second video recording means in accordance with the alarm information and the intrusion time of the person, and recorded. Therefore, it is possible to record efficiently, i.e., without wastefully spending a recording medium, the behavior of the person, at the time of intrusion into the monitoring area, who has left behind an object.

A monitoring camera of the invention is used in the monitoring camera system.

A video recording apparatus of the invention is used in the monitoring camera system.

A video recording apparatus of the invention configured to record video information from a monitoring camera, includes: person detection means for detecting an intrusion of a person into a predetermined monitoring area based on the video information received from the monitoring camera; time recording means for, when the intrusion of the person into the monitoring area is detected by the person detection means, recording the intrusion time; object detection means for detecting a left-behind object after the person has passed through the monitoring area based on the video information from the monitoring camera; alarm information generation means for generating alarm information when a given time elapses after the left-behind object in the monitoring area is detected by the object detection means; first video recording means for recording the video information; and second video recording means for receiving via a transfer from the first video recording means and recording, of the video information recorded in the first video recording means, video information from the intrusion time of the person to a time corresponding to the alarm information in accordance with the alarm information and the intrusion time of the person.

With this configuration, the video information transmitted from the monitoring camera is received and recorded in the first video recording means. Further, when the alarm information and the intrusion time of the person transmitted from the monitoring camera are received, the video information from the intrusion time of the person to the time corresponding to the alarm information of the video information recorded in the first video recording means is transferred from the first video recording means to the second video recording means in accordance with the alarm information and the intrusion time of the person, and is recorded. Therefore, it is possible to record efficiently, i.e., without wastefully spending a recording medium, the behavior of the person, at the time of intrusion into the monitoring area, who has left behind the object.

A video recording method of the invention for recording video information from a monitoring camera, includes: a person detection step of detecting an intrusion of a person into a predetermined monitoring area based on the video information from the monitoring camera; a time recording step of, when the intrusion of the person into the monitoring area is detected in the person detection step, recording the intrusion time; an object detection step of detecting a left-behind object after the person has passed through the monitoring area based on the video information from the monitoring camera; an alarm information generation step of generating alarm information when a given time elapses after the left-behind object in the monitoring area is detected in the object detection step; a first video recording step of recording the video information; and a second video recording step of receiving via a transfer from the first video recording step and recording, of the video information recorded in the first video recording step, video information from the intrusion time of the person to a time corresponding to the alarm information in accordance with the alarm information and the intrusion time of the person.

With this method, the video information transmitted from the monitoring camera is received and recorded in the first video recording step. Further, when the alarm information and the intrusion time of the person transmitted from the monitoring camera are received, the video information from the intrusion time of the person to the time corresponding to the alarm information of the video information recorded in the first video recording step is received via the transfer from the first video recording step in accordance with the alarm information and the intrusion time of the person and is recorded in the second video recording step. Therefore, it is possible to record efficiently, i.e., without wastefully spending a recording medium, the behavior of the person, at the time of intrusion into the monitoring area, who has left behind the object.

Advantages of the Invention

According to the invention, when a person has left behind an object, such as when leaving-behind is detected, it is possible to record efficiently, i.e., without wastefully spending a recording medium, the behavior of the person, at the time of intrusion into the region, who has left behind the object.

BRIEF DESCRIPTION OF THE DRAWINGS

FIG. 3 is a flowchart illustrating the operation of the monitoring camera system of FIG. 1.

MODE FOR CARRYING OUT THE INVENTION

Hereinafter, a preferred embodiment for carrying out the invention will be described in detail with reference to the drawings.

Figure 1:
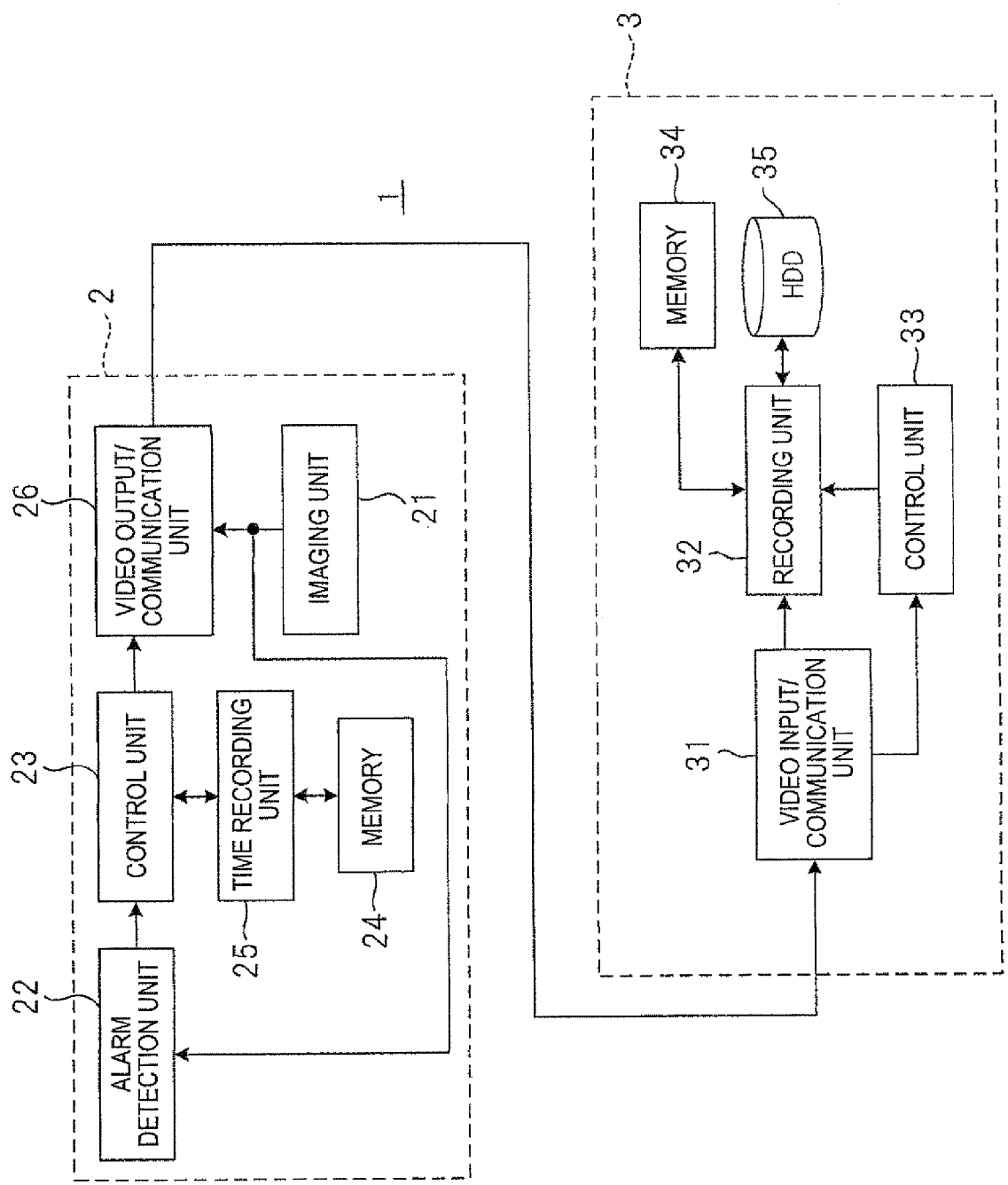
FIG. 1 is a block diagram showing a schematic configuration of a monitoring camera system according to an embodiment of the invention.
Figure 2A:
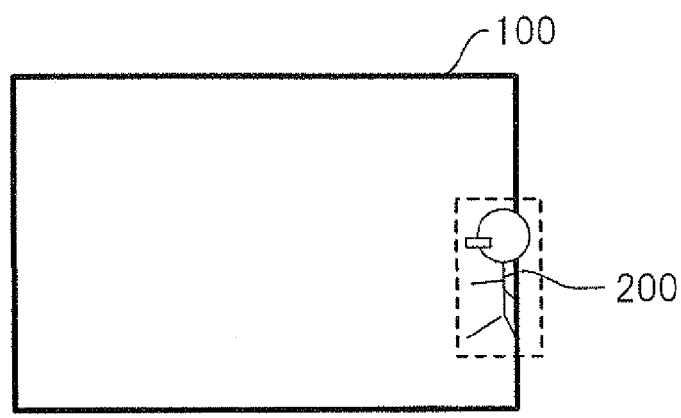
FIGS. 2(a) to 2(c) are diagrams schematically showing the operation of the monitoring camera system of FIG. 1 from when an intruder is detected until the start time of prerecording is decided.
Figure 2B:
Figure 2B:
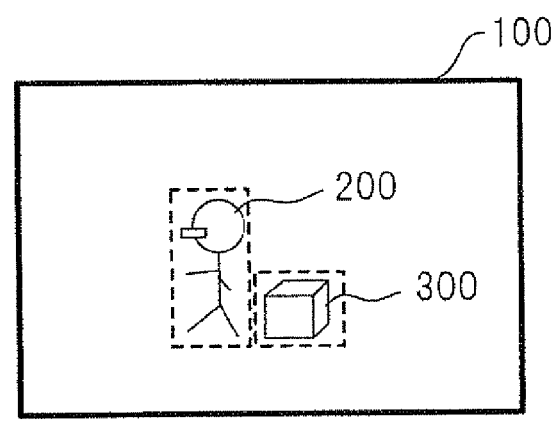
Figure 2C:
Figure 2C:
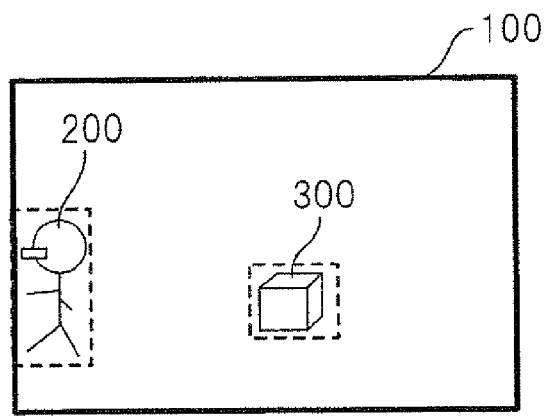

FIG. 1 is a block diagram showing the schematic configuration of a monitoring camera system according to an embodiment of the invention. In FIG. 1, a monitoring camera system 1 of this embodiment includes: a monitoring camera 2; and a video recording apparatus 3 configured to record video information from the monitoring camera 2.

The monitoring camera 2 includes an imaging unit 21, an alarm detection unit 22, a control unit 23, a memory 24, a time recording unit 25, and a video output/communication unit 26. The imaging unit 21 includes an imaging element, such as a CCD or a CMOS, and outputs video information obtained by the imaging. The alarm detection unit 22 stores a predetermined monitoring area in the form of data, and detects an intrusion of a person into a monitoring area based on the video information obtained by the imaging unit 21. When the intrusion of the person into the monitoring area is detected, the notification thereof is transmitted to the control unit 23. The alarm detection unit 22 detects a left-behind object after the person has passed through the monitoring area based on the video information obtained by the imaging unit 21. When the left-behind object is detected, the notification thereof is transmitted to the control unit 23.

If the notification of the detection the intrusion of the person is received from the alarm detection unit 22, the control unit 23 instructs the time recording unit 25 to record the time. The control unit 23 has a timer function. If the notification of the detection of the left-behind object in the monitoring area is received from the alarm detection unit 22, the control unit 23 counts the time from the detection and generates alarm information when a given time has elapsed. The generated alarm information is input to the video output/communication unit 26. When the alarm information is generated, the control unit 23 acquires the intrusion time of the person recorded in the memory 24 by the time recording unit 25 and inputs the intrusion time of the person to the video output/communication unit 26. The memory 24 is a semiconductor memory in which data is writable and erasable. For example, the memory 24 is preferably a flash memory in which the content is not erased even when power is shut off, but may be a RAM (Random Access Memory) in which the content is erased when power is shut off.

When the notification of the intrusion of the person into the monitoring area is received from the control unit 23, the time recording unit 25 records the time at that time in the memory 24 as the intrusion time. When a request to acquire the intrusion time is received from the control unit 23, the time recording unit 25 reads and outputs the intrusion time from the memory 24 in response to the request. The video output/communication unit 26 communicates with a video input/communication unit 31 described below of the video recording apparatus 3 and transmits video information obtained by the imaging unit 21. The video output/communication unit 26 transmits the alarm information and the intrusion time of the person in response to the input of the alarm information and the intrusion time from the control unit 23. When the monitoring camera 2 and the video recording apparatus 3 are connected to each other through a network, the IP protocol is used for data transfer.

The video recording apparatus 3 includes a recording unit 32, a control unit 33, a memory 34, and a hard disk (HDD) 35, in addition to the video input/communication unit 31 described above. The video input/communication unit 31 communicates with the video output/communication unit 26 of the monitoring camera 2 and receives the video information, the alarm information, and the intrusion time of the person transmitted from the video output/communication unit 26. When the video information is received, the video input/communication unit 31 inputs the video information to the recording unit 32, and when the alarm information and the intrusion time of the person are received, the video input/communication unit 31 inputs the alarm information and the intrusion time of the person to the control unit 33. When the video information is input from the video input/communication unit 31, the recording unit 32 records the video information in the memory 34. In this case, since the memory 34 has a limited capacity, overwriting is performed for every given time. The memory 34 is preferably the semiconductor memory similar to the memory 24 in the monitoring camera 2.

If the alarm information and the intrusion time are input from the video input/communication unit 31, the control unit 33 provides a recording instruction/pre-transfer instruction to the recording unit 32. The recording unit 32 overwrites the memory 34 with the video information transmitted from the monitoring camera 2 by every given amount of information (the amount defined by the storage capacity of the memory 34). When the recording instruction/pre-transfer instruction is provided from the control unit 33, the recording unit 32 transfers the video information recorded in the memory 34 to the hard disk 35. In this case, the recording unit 32 transfers video information of a period from the intrusion time of the person to the time corresponding to the alarm information of the video information recorded in the memory 34 to the hard disk 35 in accordance with the alarm information and the intrusion time of the person.

In the monitoring camera 2, the imaging unit 21 serves as imaging means. The alarm detection unit 22 serves as person detection means and object detection means. The control unit 23 serves as alarm information generation means. The time recording unit 25 serves as time recording means. The video output/communication unit 26 serves as transmission means.

In the video recording apparatus 3, the video output/communication unit 26 serves as reception means. The recording unit 32 and the memory 34 serve as first video recording means. The recording unit 32 and the hard disk 35 serve as second video recording means.

FIG. 2 is a diagram schematically showing the operation in the monitoring camera system 1 of this embodiment from when an intruder is detected until the start time of prerecording is decided. In FIG. 2, if the monitoring camera 2 detects a person who intrudes into a monitoring area 100, that is, an intruder 200, the intrusion time is stored (FIG. 2(a)). When the intruder 200 has left behind an object 300 in the monitoring area 100, the detection of the left-behind object 300 starts (FIG. 2(b)). If the time for which the object 300 remains still exceeds a given time, a leaving-behind alarm is decided, and the time at which the intruder 200 is detected (that is, the intrusion time stored in FIG. 2(a)) is decided as the start time of prerecording (FIG. 2(c)).

FIG. 3 is a flowchart illustrating the operation of the monitoring camera system 1 of this embodiment. In FIG. 3, Steps S10 to S15 is performed in the monitoring camera 2, and Steps S16 and S17 is performed in the video recording apparatus 3.

In the monitoring camera 2, first, it is determined whether an intruder is detected (Step S10). When an intruder is not detected, the determination is repeated, and when an intruder is detected, the time at the detection of the intruder, i.e., the intrusion time, is stored in the memory 24 (Step S11). After the intrusion time has been stored, the intruder whose intrusion has been detected is tracked (acquired) (Step S12), and it is determined whether an object is left behind after the intruder has passed through a monitoring area (Step S13). When no object is left behind, the determination is repeated, and when an object is left behind, it is determined whether a given time elapses after the object has been still and a leaving-behind alarm is decided (Step S14). When the leaving-behind alarm cannot be decided, the determination is repeated until the alarm can be decided. When the leaving-behind alarm can be decided, a notification of the leaving-behind alarm and the intrusion time are transmitted to the video recording apparatus 3 (Step S15). The above is the operation of the monitoring camera 2.

Next, in the video recording apparatus 3, if the notification of the leaving-behind alarm and the intrusion time are received from the monitoring camera 2, the operation of the leaving-behind alarm is carried out (Step S16). Specifically, a lamp is lighted up or a sound is produced. After the operation of the leaving-behind alarm is carried out, recording information from the stored intrusion time is decided as prerecording. That is, recording information from the intrusion time stored in the memory 34 is decided as prerecording based on the intrusion time in the notification transmitted from the monitoring camera 2. The recording information decided as prerecording is transferred from the memory 34 to the hard disk 35 and recorded in the hard disk 35 (Step S17).

As described above, according to the monitoring camera system 1 of this embodiment, the monitoring camera 2 always transmits video information to the video recording apparatus 3, records the intrusion time when an intruder is detected, tracks the detected intruder, decides an alarm when an object is left behind after the intruder has passed through the monitoring area and when the object continues to remain still for a given time, and transmits the alarm information and the intrusion time to the video recording apparatus 3. The video recording apparatus 3 overwrites the memory 34 with the video information transmitted from the monitoring camera 2 by every given amount of information. When the alarm information and the intrusion time of the person are received, the video recording apparatus 3 transfers, of the video information recorded in the memory 34, video information from the intrusion time to the time corresponding to the alarm information from the memory 34 to the hard disk 35 in accordance with the alarm information and the intrusion time of the person, and records the transferred video information in the hard disk 35. Therefore, it is possible to record efficiently, i.e., without wastefully spending a recording medium, the behavior of a person, at the time of intrusion into the monitoring area, who has left behind an object.

Although in the above-described embodiment, the monitoring camera 2 has the function of detecting the intruder and the function of detecting the left-behind object, these functions may be provided in the video recording apparatus 3. In this case, the notification (the leaving-behind alarm and the detection time at which the intruder is detected) from the monitoring camera 2 to the video recording apparatus 3 is not required.

Although the invention has been described in detail in connection with a specific embodiment, it is apparent to those skilled in the art that various changes or modifications may be made without departing from the spirit and scope of the invention.

This application is based on Japanese Patent Application (Application No. 2009-028923) filed on Feb. 10, 2009, the content of which is incorporated herein by reference.

Industrial Applicability

According to the invention, when a person has left behind an object, such as when leaving-behind is detected, it is possible to efficiently record the behavior of the person, at the time of instruction into a region, who has left behind the object. The invention can be applied to a monitoring camera system which includes a monitoring camera and a video recording apparatus.

Description Of Reference Skins

1: monitoring camera system
  2: monitoring camera
  3: video recording apparatus
  21: imaging unit
  22: alarm detection unit
  23: control unit
  24: memory
  25: time recording unit
  26: video output/communication unit
  31: video input/communication unit
  32: recording unit
  33: control unit
  34: memory
  35: hard disk

The invention claimed is:

1. A monitoring camera system comprising;
a monitoring camera; and
a video recording apparatus configured to record video information received from the monitoring camera,
wherein the monitoring camera comprises:
  an imager;
  a person detector configured to detect an intrusion of a person into a predetermined monitoring area based on video information obtained by the imager;
  a time recorder configured to, when the intrusion of the person into the monitoring area is detected by the person detector, record an intrusion time;
  an object detector configured to detect a left-behind object after the person has passed through the monitoring area based on the video information obtained by the imager;
  an alarm information generator configured to generate alarm information in response to the detection of the left-behind object by the object detector; and
  a transmitter configured to transmit the video information obtained by the imager, the alarm information generated in case of the alarm information generated by the information generator, and the intrusion time of the person recorded by the time recorder, and
wherein the video recording apparatus comprises:
  a receptor configured to receive the video information, the alarm information, and the intrusion time of the person transmitted from the transmitter of the monitoring camera;
  a first video recorder configured to overwrite so as to record the video information received by the receptor by every fixed amount of information, the overwriting comprising recording over a part of the video information with another part of the video information;
  a second video recorder configured to receive and record video information recorded in the first video recorder; and
  a controller configured to receive from the receptor the intrusion time of the person and a time corresponding to the alarm information and configured to transfer particular video information to the second video recorder, wherein the particular video information is within a time period having a start time and an end time respectively based upon the intrusion time and the time corresponding to the alarm information.

2. A monitoring camera used in the monitoring camera system according to claim 1.

3. A video recording apparatus used in the monitoring camera system according to claim 1.

4. A video recording apparatus configured to record video information from a monitoring camera, comprising:
  a person detector configured to detect an intrusion of a person into a predetermined monitoring area based on the video information received from the monitoring camera;
  a time recorder configured to, when the intrusion of the person into the monitoring area is detected by the person detector, record the intrusion time;
  an object detector configured to detect a left-behind object after the person has passed through the monitoring area based on the video information from the monitoring camera;
  an alarm information generator configured to generate alarm information in response to the detection of the left-behind object by the object detector;
  a first video recorder configured to overwrite so as to record the video information by every fixed amount of information, the overwriting comprising recording over a part of the video information with another part of the video information;
  a second video recorder configured to receive and record video information recorded in the first video recorder; and
  a controller configured to receive the intrusion time of the person and a time corresponding to the alarm information and configured to transfer particular video information to the second video recorder, wherein the particular video information is within a time period having a start time and an end time respectively based upon the intrusion time and the time corresponding to the alarm information.

5. A video recording method for recording video information from a monitoring camera, comprising:

detecting an intrusion of a person into a predetermined monitoring area based on the video information from the monitoring camera;

recording the intrusion time when the intrusion of the person into the monitoring area is detected;

detecting a left-behind object after the person has passed through the monitoring area based on the video information from the monitoring camera;

generating alarm information in response to the detection of the left-behind object;

overwriting so as to record, in a first video recording step, the video information by every fixed amount of information, the overwriting comprising recording over a part of the video information with another part of the video information; and recording, in a second video recording step, particular video information of the video information recorded in the first video recording step, wherein the particular video information is within a time period having a start time and an end time respectively based upon the intrusion time and the time corresponding to the alarm information.

6. The monitoring camera system of claim 1, wherein the particular video information is a part of the video information recorded by the first recorder.

7. The video recording apparatus of claim 4, wherein the particular video information is a part of the video information recorded by the first recorder.

8. The video recording method of claim 5, wherein the particular video information is a part of the video information recorded by the first recorder.

\* \* \* \* \*